UNITED STATES PATENT OFFICE

ERIK B. BJORKMAN, OF NEW YORK, N. Y., ASSIGNOR TO THE AEROCRETE CORPORATION OF AMERICA, OF NEW YORK, N. Y., A CORPORATION OF DELAWARE

METHOD OF MAKING INSULATING TILE OR BRICK

No Drawing. Application filed March 7, 1930. Serial No. 434,173.

My invention relates to a method intended particularly for the manufacture of light, strong and insulating hollow tiles, intended for use in modern fire proof buildings for partition walls, as insulating back-up of brick or stone walls and for load-bearing walls where the pressure on the units is not unduly large. The method is not limited to the manufacture of hollow tiles, but may be employed for making light, strong and insulating bricks or other solid unitary structures.

My main object is to provide a method or process by which very superior tiles or bricks can be made at low cost, as I will more particularly explain hereafter. A further object is to provide a method or process by which the time required to cure the tiles or bricks will be very much less than at present, thereby doing away with the necessity of keeping large stocks on hand over long periods of time.

As a matter of fact, with my improved method the resulting article can be shipped out for use within forty-eight hours after pressing, whereas with existing methods the time required for curing may be a matter of several months. Obviously in the latter case, capital will be tied up, represented by the value of tiles or bricks in process of curing. By my improved method, the tiles or bricks are not only made more cheaply and in far less time than is now possible, but the resulting product possesses superior qualities for practical use as I shall point out hereafter.

In carrying my method into effect, I make use of blast furnace slag both as an aggregate and as binding material, the latter function being supplemented, if desired, by the addition of a small quantity of Portland cement or other hydraulic cement. The blast furnace slag should be basic as opposed to acidic, that is to say, it should be one in which the lime content predominates. If magnesia is present, the magnesia content will play a rôle in determining the basic character of the slag so that a slag may be basic if sufficient magnesia be present, even though there is a deficiency of lime. It has been found that if basic slag is not used there is little or no hydration, in which case the slag is inert and acts simply as an aggregate.

The basic blast furnace slag is first granulated as is well known in the art by subjecting the molten slag to the sudden chilling effect of water, steam, or an air blast. This sudden chilling results in great internal stresses, which cause the slag to be cracked or broken up into pieces of varying size and shape. Much of the granulated slag will be in the form of light, fluffy particles and flakes, while some of it will be in the form of dense porous lumps of varying size.

I now subject the slag to a screening operation by which the porous lumps will be separated from the finer fluffy material and the two portions thus separated are accumulated in separate piles or bins.

Heretofore it has been proposed to use the porous lumps as an aggregate in the manufacture of brick but I have found that with my method these lumps are quite unsuited for this purpose as I shall explain hereafter. However, the large porous lumps are very fragile and friable so that they can be readily ground to cement fineness in a ball or tube mill or other pulverizing apparatus. Furthermore, the smaller particles of the slag which have been separated by a screening constitute a very satisfactory and cheap aggregate material.

Having separated the larger porous lumps by screening as explained, the latter are now thoroughly dried and are ground to cement fineness in any suitable apparatus for the purpose.

The size of screen used will vary according to the dimensions of the granules of the slag, but ordinarily the openings in the screen may vary from one-fourth to one-half inch. With such a screen under normal conditions there will be a satisfactory separation of the light, fluffy particles suitable for use as an aggregate and the larger porous lumps which are to be ground.

When an exceptionally strong tile or brick is required or when the basic qualities of the slag are not high, Portland cement or other suitable hydraulic cement may be added in proportions not to exceed 20%. When Portland cement is used, I prefer to grind the cement clinker in the same apparatus and at the same time as the grinding of the slag. Cement clinker, as is well known, is the product of the rotary kiln, is relatively cheap, and in its unground state is practically as inert as gravel, so that it may be transported in open cars.

By grinding the lumps of blast furnace slag together with Portland cement clinker, it is possible to obtain an extremely intimate mixture of the two materials, and at the same time the cost of pulverizing the mixture is lower than the cost of pulverizing each of the two materials separately. I find furthermore, that by grinding the two materials together, the intermixture is so complete that a smaller amount of Portland cement is required to obtain the necessary qualities in the final product than if ground Portland cement is mixed with ground slag. In the latter case the intermixture is necessarily less intimate (when the time element is considered) than when the two materials are ground together.

Moreover, I find that when it is desirable to add lime, a smaller amount of lime is required to accomplish the same purposes when the two materials are ground together than is required when the attempt is made to intimately mix ground cement and ground slag.

After having ground the lumps of granulated slag (with or without the addition of Portland cement) I mix the cement mixture with the finer particles of granulated slag obtained by the preliminary screening. Suitable proportions vary from twenty to fifty parts of the cement mixture to from eighty to fifty parts of the aggregate material by weight. Water in small quantity is added, and if desired, lime may also be employed.

The mass, having been first kneaded or worked to a homogeneous almost dry condition as is common in the art, is then formed into bricks or tiles under great pressure in a suitable machine for the purpose. The article so formed may be made hollow or be solid throughout. If the attempt were made to use the large porous lumps as aggregate material, the pressure applied in forming bricks or tiles would crush these particles to a fine sand owing to their fragility and friability, thus making the finished product weak and undesirable.

Having thus molded the tiles or bricks under pressure, the next step in my improved method has to do with the curing of the tiles or bricks.

For this purpose I make use of steel chambers of sufficient size to accommodate the desired number of tiles or bricks, which chambers are adapted to be closed after the articles are introduced therein so as to permit steam pressure to develop within the chambers. Steam is now introduced in the chambers of a pressure not less than fifty pounds per square inch, but preferably in the neighborhood of one hundred pounds, per square inch, and the tiles or bricks are kept in the steam chambers for a period of not more than forty-eight hours while being subjected to the heat and pressure. In this way the tiles will be heated so that a very rapid and thorough setting of the ground slag and cement takes place.

I have found in practice that this setting and curing can be effected inside of forty-eight hours. At the end of the curing operation, the steam pressure is immediately reduced and since the temperature of the finished tiles or bricks is far above the boiling point of water all moisture will evaporate very rapidly. In this way the time and expense of a separate drying operation is avoided. No further curing is necessary, since tiles or bricks made as I have described are as hard after a period of forty-eight hours as they would ordinarily be when cured under normal temperature during a period of several months.

The important result to which I have referred is due to the fact that cement made from granulated slag hardens very rapidly at high temperature but very slowly indeed at ordinary temperature. In this way I am able to put the tiles or bricks on the market immediately after they are made and thus do away with the cost of maintaining a large stock on hand while curing is taking place.

By curing tiles or bricks under high temperature and pressure, I obtain a product of great stability and strength. As I have pointed out it is not neecssary to use Portland cement clinker as an admixture unless extraordinary strength is desired or unless the slag is low in cementing qualities.

In manufacturing tiles or bricks of Portland cement and of aggregate material, the contraction which takes place in drying and curing the articles is relatively large. With my improved method, this factor is practically negligible, due to the use of a large percentage of granulated slag and to the fact that the curing takes place under high pressure and temperature conditions. In other words, when granulated slag cement is employed, the shrinkage is much less than when ordinary Portland cement is used, assuming that the curing in both cases takes place under normal temperature.

By using granulated slag as pointed out, and effecting the curing under high temperature and pressure, the contraction during drying and setting is exceedingly low.

The advantage of thus reducing shrinkage or contraction to a minimum is obvious. In fact, one of the greatest obstacles to the commercial use of concrete products made under existing methods is the substantial and variable shrinkage which occurs during the drying operation. As a result, under existing methods, the finished product may not correspond either in size or shape to the desired standard.

Tiles and bricks made according to my improved method possess considerable strength, while at the same time their weight is only about one-half as much as tiles or bricks made of ordinary concrete. This low weight is due to the use of an extremely light aggregate since the granular particles of the blast furnace slag are porous. The strength of the product is due in part to the removal of bulky lumps from the aggregate which will become crushed during the formation of the article and also due to the special method of curing under heat and pressure. As a matter of fact, I have found by experience that almost double the strength is obtained by curing the product in the manner described as compared to ordinary methods of curing such as in a moist room at normal temperature.

The method of making tiles and bricks described herein is very economical since blast furnace slag is a by-product from the manufacture of pig-iron and can be obtained at low cost.

Ordinarily, when blast furnace slag is used as a cement, it is necessary to add relatively large amounts of lime or Portland cement in order to obtain the desired strength. With my improved method such an addition is unnecessary, although as I have pointed out, it may be desirable at times and for special purposes to add a small proportion of Portland cement. The fact that with my improved method very substantial strength is secured without the use of Portland cement is due to the rapidity and thoroughness with which the chemical reactions in the slag cement take place to cause hardening under the effect of pressure and heat.

Having now described my invention, what I claim is new therein and desire to secure by Letters Patent is as follows:

1. The method of making bricks or tiles which consists in screening granulated blast furnace slag, grinding the larger porous particles to cement fineness, adding thereto the finer particles as an aggregate, adding water, forming the tiles or bricks under pressure, and curing the same.

2. The method of making bricks or tiles which consists in screening granulated blast furnace slag, grinding the larger porous particles to cement fineness, adding thereto the finer particles as an aggregate, adding water, forming the tiles or bricks under pressure, and curing the same in the presence of heat.

3. The method of making bricks or tiles which consists in screening granulated blast furnace slag, grinding the larger porous particles to cement fineness, adding thereto the finer particles as an aggregate, adding water, forming the tiles or bricks under pressure, and curing the same in the presence of heat and pressure.

4. The method of making bricks or tiles which consists in screening granulated blast furnace slag, grinding the larger porous particles to cement fineness, adding thereto the finer particles as an aggregate, adding water, forming the tiles or bricks under pressure, curing the same in the presence of heat and pressure, and finally releasing the pressure to cause moisture to immediately evaporate.

5. The method of making tiles or bricks which consists in screening granulated blast furnace slag to separate larger particles from smaller ones, simultaneously grinding the larger particles and cement clinker to cement fineness, adding the smaller particles as an aggregate, adding water, forming the tile or bricks under pressure and finally curing the same.

ERIK B. BJORKMAN.